US012783987B2

(12) United States Patent
Kumar et al.

(10) Patent No.: US 12,783,987 B2
(45) Date of Patent: Nov. 3, 2026

(54) ARTIFICIAL INTELLIGENCE-ASSISTED TRANSFORMATION OF UNSTRUCTURED PROCESSES TO STRUCTURED

(71) Applicant: SAP SE, Walldorf (DE)

(72) Inventors: Abhinav Kumar, Bangalore (IN); Prashantha H J, Bangalore (IN); Vikas Rohatgi, Bangalore (IN)

(73) Assignee: SAP SE, Walldorf (DE)

(*) Notice: Subject to any disclaimer, the term of this patent is extended or adjusted under 35 U.S.C. 154(b) by 222 days.

(21) Appl. No.: 18/390,550

(22) Filed: Dec. 20, 2023

(65) Prior Publication Data

US 2025/0209407 A1 Jun. 26, 2025

(51) Int. Cl.
*G06Q 10/067* (2023.01)
*G06F 18/2415* (2023.01)

(52) U.S. Cl.
CPC ....... *G06Q 10/067* (2013.01); *G06F 18/2415* (2023.01)

(58) Field of Classification Search
CPC ............. G06Q 10/067; G06Q 10/0672; G06Q 10/0674; G06F 18/2415
USPC .......................................................... 705/348
See application file for complete search history.

(56) References Cited

U.S. PATENT DOCUMENTS 10,554,817 B1 * 2/2020 Sullivan .............. H04M 7/0036
11,610,137 B1 * 3/2023 Buhler .................. G06F 16/212
12,118,490 B1 * 10/2024 Hooks ................. G06F 11/3438
2005/0165822 A1 * 7/2005 Yeung .................... G06Q 10/10 707/999.102
2009/0235225 A1 * 9/2009 Killisperger ........... G06Q 10/10 717/101
2016/0267268 A1 * 9/2016 Sheldon ............. G06Q 10/0635
2019/0087755 A1 * 3/2019 Hull ...................... G06Q 10/067
2020/0342382 A1 * 10/2020 Dianov .................. G06Q 10/06
2021/0304139 A1 * 9/2021 Sridhara ................ G06Q 10/10
2022/0075605 A1 * 3/2022 Iyer .......................... G06N 3/04

(Continued)

FOREIGN PATENT DOCUMENTS

WO WO-2020167559 A1 * 8/2020 ............. G06N 3/045

OTHER PUBLICATIONS

Diaz, O.; Pérez, M. Strategy Mining for Inferring Business Information System User Intentions. Appl. Sci. 2022, 12, 5949. https://doi.org/10.3390/app12125949 (Year: 2022).*

(Continued)

*Primary Examiner* — Shannon S Campbell
*Assistant Examiner* — Lisa Ma
(74) *Attorney, Agent, or Firm* — SCHWEGMAN LUNDBERG & WOESSNER, P.A.

(57) ABSTRACT

In an example embodiment, a solution for converting unstructured process models to structured process models is described. Machine learning is used to automatically create a first set of suggested optimizations for an unstructured process model based upon context data (and possibly execution logs as well) for the unstructured process model. A heuristic rules engine can then create a second set of suggested optimizations for the unstructured process model. The suggested optimizations may be presented to a user via a user interface. Some or all of the optimizations may then be performed on the unstructured process model, and then the optimized unstructured process model can be converted to a structured process model.

20 Claims, 5 Drawing Sheets

(56) References Cited

U.S. PATENT DOCUMENTS

| | | | | |
|---|---|---|---|---|
| 2023/0117225 | A1* | 4/2023 | Porto Guedes | G06Q 10/0633 705/7.27 |
| 2023/0177441 | A1* | 6/2023 | Durvasula | G06N 3/08 706/45 |
| 2023/0376838 | A1* | 11/2023 | El Hattami | G06N 3/096 |
| 2024/0303571 | A1* | 9/2024 | Mueller | G06Q 10/0633 |
| 2024/0419641 | A1* | 12/2024 | Gandhi | G06F 16/215 |
| 2025/0200485 | A1* | 6/2025 | Wilk | G06Q 10/06393 |
| 2025/0373516 | A1* | 12/2025 | Gupta | H04L 41/22 |

OTHER PUBLICATIONS

Deokar, A.V., Tao, J. Semantics-based event log aggregation for process mining and analytics. Inf Syst Front 17, 1209-1226 (2015). https://doi.org/10.1007/s10796-015-9563-4 (Year: 2015).*

R. Zhu et al., "Automatic Real-Time Mining Software Process Activities From SVN Logs Using a Naive Bayes Classifier," in IEEE Access, vol. 7, pp. 146403-146415, 2019, doi: 10.1109/ACCESS.2019.2945608 (Year: 2019).*

Ajmal et al. "Automated BPMN Diagram Generation," 2024 6th International Conference on Advancements in Computing (ICAC), Colombo, Sri Lanka, pp. 7-12, doi: 10.1109/ICAC64487.2024.10851120, https://ieeexplore.ieee.org/abstract/document/10851120 (Year: 2024).*

* cited by examiner

ARTIFICIAL INTELLIGENCE-ASSISTED TRANSFORMATION OF UNSTRUCTURED PROCESSES TO STRUCTURED

TECHNICAL FIELD

This document generally relates to computer systems. More specifically, this document relates to using artificial intelligence to assist transforming unstructured processes to structured.

BACKGROUND

Case management involves managing various processes. In this context, the term "case" refers to a grouping of actions taken to perform some sort of desired outcome. It is often event-driven and utilized by organizations to manage processes involving managing processes with actions that need to be shared by multiple employees or members.

Case Management Model and Notation™ (CMMN™), created by the Object Management Group™ (OMG™) of Millford, MA, defines a common meta-model and notation for modeling and graphically expressing a case as well as an interchange format for exchanging case models among different tools. CMMN is intended to capture the common elements that case management products use, while also taking into account current research contributions on case management. Known as an Adaptive Case Management, CMMN aids in the decision-making process through suggestions. CMMN is centered around information and relationships, in contrast to more traditional process management centered around a-priori defined activity sequences.

BRIEF DESCRIPTION OF DRAWINGS

The present disclosure is illustrated by way of example and not limitation in the figures of the accompanying drawings, in which like references indicate similar elements.

DETAILED DESCRIPTION

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

CMMN and Business Process Model and Notation (BPMN) represent two distinct paradigms in the domain of process modeling. CMMN, grounded in a declarative approach, excels in managing intricate and unstructured business cases, emphasizing flexibility through the definition of outcomes without prescribing granular steps. In contrast, BPMN is designed for well-defined, stable, and repeatable processes. However, the very adaptability that defines CMMN can present challenges when optimizing workflow, necessitating a bridge between these paradigms. In an example embodiment, a comprehensive methodology that unifies machine learning techniques and heuristic analysis to optimize CMMN models is provided. Subsequently, these optimized CMMN workflows can be converted into structured BPMN models, ushering in stability and endurance.

Figure 1:
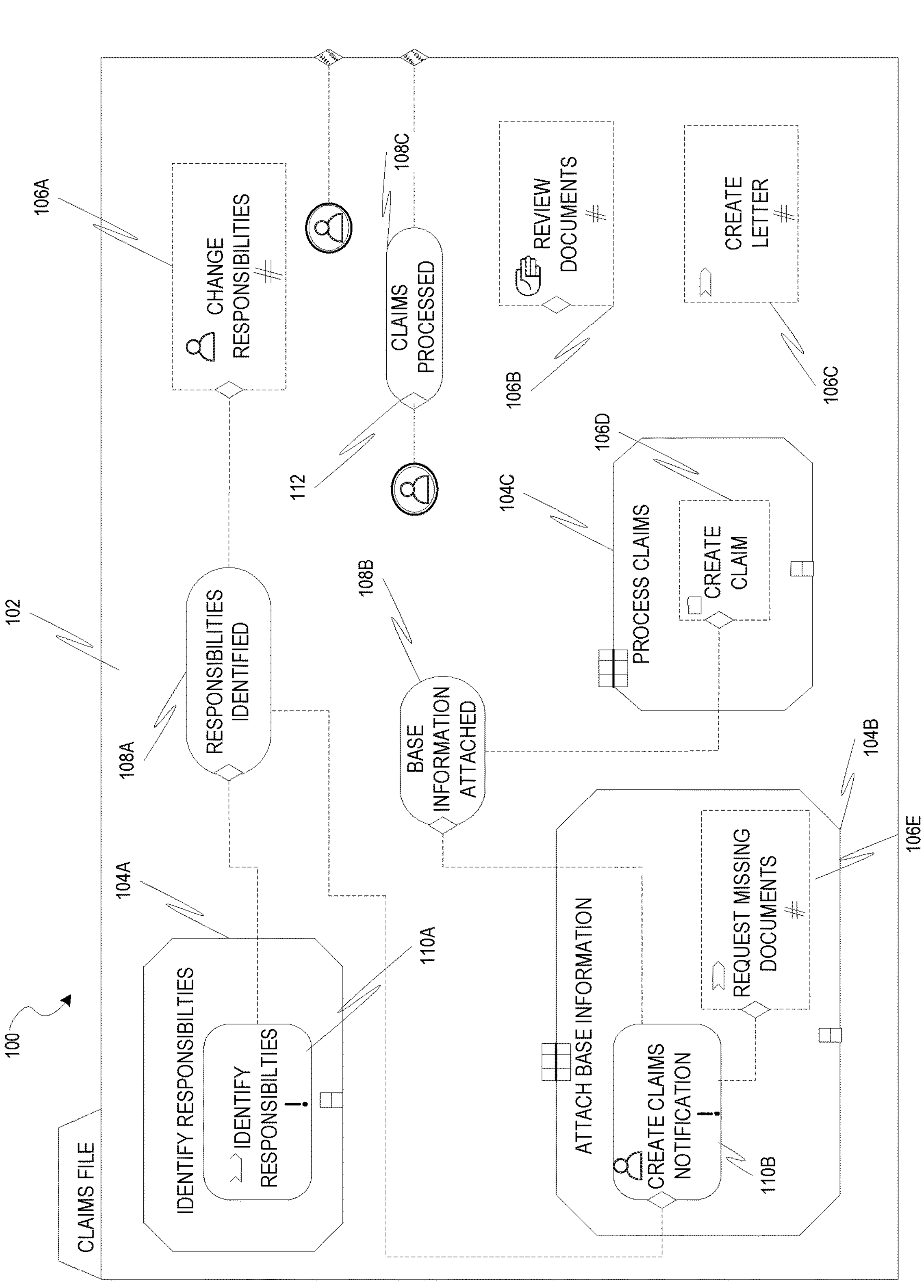
FIG. 1 is a diagram illustrating an example unstructured model used to represent a process for processing insurance claims, in accordance with an example embodiment.

More particularly, CMMN is a way to graphically represent a process. FIG. 1 is a diagram illustrating an example CMMN 100 used to represent a process for processing insurance claims, in accordance with an example embodiment. The CMMN 100 contains a number of different elements, including a case plan model 102 (in the shape of a folder), which serves as a top-level container for defining the case structure and organizing its elements, stages 104A, 104B and 104C (in an octagonal shape), which represent major phases within a case (and can be mandatory or discretionary), and can be used to group and organize tasks and events related to specific phases of the case, tasks 106A, 106B, 106C, 106D, 106E (in the shape of a rectangle) represent individual work items or activities that need to be performed as part of the case (they can be mandatory (symbolized with a !), repeatable (symbolized with a #), or discretionary (symbolized by a dashed rectangle)), and milestones 108A, 108B (in the shape of a oval), represent occurrences or achievements of a milestone that can be used to indicate the initiation or completion of tasks or other changes. There are also tasks 110A, 110B (in the shape of a rounded rectangle), within the case, and sentries (such as 112) (in the shape of diamonds), which are used to represent dynamic conditions or rules that act as a criterion to activate a task. Additionally, task 106A has an icon representing a person, indicating that this is a human task. Likewise, task 106B has an icon representing a hand, indicating that this is a non-blocking human task.

The initial phase of the methodology is data collection, encompassing real-time data acquisition from the running CMMN process. This dynamic and comprehensive dataset not only includes runtime logs but also critical input/output context for each individual activity or step.

Runtime logs are used as they construct a flow graph that meticulously traces the specific paths taken by various process instances. They offer insights into process dynamics, revealing dependencies between various tasks at runtime, enabling a real-time understanding of the relationships between activities. Importantly, these logs provide valuable information about the sequence of actions taken by knowledge workers, shedding light on the decision-making processes within the CMMN framework.

Simultaneously, real-time context information (e.g., input/output context for each individual activity or step) can be leveraged, extending beyond resource utilization to capture the specific actions taken by knowledge workers in real-time. This context encapsulates the interplay of context and decision-making. It delves into the intricacies of decision-making, resource allocation, and adaptive behavior within the CMMN framework, revealing the profound impact of context on the knowledge worker's actions.

The collected data undergoes rigorous pre-processing, ensuring its quality and consistency. Data cleaning procedures systematically eliminate errors and inaccuracies, guaranteeing the reliability and accuracy of the dataset. Data normalization is then applied to standardize units of measurement, making it possible to compare and analyze different data elements effectively.

In essence, the data collection phase captures real-time insights that illuminate the interplay of context and decision-making within the CMMN process. This rich dataset is the basis upon which the subsequent stages of analysis and optimization are built, delivering a comprehensive understanding of knowledge worker actions and their impact on the process.

Subsequently, the methodology leverages the power of Artificial Intelligence (AI) and Machine Learning (ML) analysis, employing both supervised and unsupervised learning techniques to extract valuable insights from the data gathered from the unstructured process.

In the realm of supervised learning, the goal is to categorize activities within the unstructured process, essentially identifying distinct events such as “user inquiries” or “issue resolutions.” To accomplish this, in an example embodiment a Naive Bayes Classifier, is used to calculate the probability of a particular activity being associated with a specific event. This probabilistic approach helps classify activities based on features such as activity attributes, timestamps, and other relevant data. Similarly, Decision Trees could be used to create a hierarchical structure of decision rules to categorize activities. Decision rules are formed by recursively splitting the dataset based on the most significant feature at each level of the tree. This approach is particularly useful for scenarios where various attributes need to be considered. Further Random Forest can be utilized, an ensemble learning method that combines multiple decision trees to enhance classification accuracy. The strength of Random Forest lies in its ability to reduce overfitting and provide a more robust solution for event recognition. To extract crucial features for event recognition, feature importance scores generated by the Random Forest algorithm can optionally be used as well.

In unsupervised learning, the goal is to cluster similar activities or cases within the unstructured process, revealing common characteristics and unusual cases. The K-Means Clustering algorithm is a valuable tool for this task. It groups activities based on their similarity and can be guided by feature extraction methods like Principal Component Analysis (PCA) to reduce dimensionality and capture essential information. Alternatively, DBSCAN (Density-Based Spatial Clustering of Applications with Noise) identifies clusters in high-density areas and outliers in low-density areas. For unstructured process analysis, DBSCAN can group activities that frequently occur together, indicating common patterns. The feature extraction process here involves defining a distance metric to gauge the similarity between activities. Additionally, Isolation Forest, an anomaly detection algorithm, is another component of a possible unsupervised learning approach to identify unusual cases or outliers.

Feature extraction in AI analysis involves selecting the most relevant attributes from the data to use in machine learning algorithms. A method such as Principal Component Analysis (PCA) can be used to reduce dimensionality while preserving critical information. Feature selection techniques generally encompass mutual information, correlation analysis, and recursive feature elimination (RFE), to identify the most informative attributes for event recognition and clustering in CMMN processes. In cases involving textual data, word embeddings can be used to convert text into vector representations, which serve as features for machine learning algorithms.

A heuristic rules engine can be used to analyze and optimize running unstructured processes. The heuristic rules engine initiates its analysis by first identifying essential attributes within the running unstructured process. These attributes encompass a wide range of process-specific parameters, such as resource allocations, case details, and event occurrences. These identified attributes are then meticulously extracted and stored for further examination.

Following attribute identification, the heuristic rules engine proceeds to map these attributes to the repository of existing processes. This repository is a comprehensive database containing optimized processes built on industry standards using best practices. The Heuristic Rules Engine is designed to search and compare the attributes of the running unstructured process to the attributes present within the repository.

The process for identifying these attributes is comprehensive and systematic. It begins by parsing the rich dataset, comprising runtime logs and contextual information, to extract attributes that offer a real-time understanding of how knowledge workers interact with and influence the CMMN process. These attributes are carefully selected based on their relevance to event recognition, decision-making, resource allocation, and overall process behavior.

Once the relevant attributes are identified, the Heuristic Rules Engine proceeds to compare these attributes to a comprehensive repository of existing processes. This comparison process does not just rely on semantic search but employs a multi-faceted approach. First, the engine evaluates attribute similarity, looking for matches between the running CMMN process and processes in the repository based on shared attributes. The degree of attribute overlap serves as an initial indicator of relevance.

Furthermore, the engine examines attribute patterns and sequences to identify structural similarities between the running CMMN case and stored processes. This analysis considers not only the presence of attributes but also their temporal order and relationships within the process.

Additionally, the Heuristic Rules Engine takes into account heuristic rules and best practices derived from the repository. These rules define recommended process patterns and behaviors. By comparing the behavior of the knowledge worker in the running CMMN process to these established rules, the engine can assess alignment with industry standards and compliance requirements.

The Heuristic Rules Engine is designed to be adaptable, enabling it to recognize varying levels of attribute similarity and patterns. It utilizes a weighted approach, assigning significance to attributes and patterns based on their relevance and impact. This nuanced evaluation ensures that the engine can identify processes in the repository that are most relevant to the ongoing CMMN case.

Once relevant processes are identified in the repository, the Heuristic Rules Engine generates a set of recommendations aimed at improving the running unstructured process. These recommendations are intricately tailored to generate a set of recommendations that encompass not only attribute matching but also process structure, resource allocation, and compliance considerations. For example, the heuristic rules engine may suggest optimizing the sequence of activities, reallocating resources strategically to alleviate bottlenecks, or identifying areas where certain process components can be reused to heighten efficiency.

In order to ensure that the optimization process is practical and effective, the heuristic rules engine ranks the generated suggestions based on their potential impact and feasibility. The highest-impact, most feasible improvements are prioritized, considering factors like expected reductions in execution time, cost savings, and adherence to industry standards. This prioritization process ensures that the most significant enhancements are suggested first.

Through the deployment of the Heuristic Rules Engine, the methodology offers a structured, data-driven approach to unstructured process optimization. This approach leverages historical process data, well-established heuristics, and best practices to suggest tailored improvements that address the specific attributes and challenges encountered in the running unstructured process. Not only does this optimize workflow performance, but it also ensures that the improvements are in harmony with industry standards and the organization's overarching objectives.

An optimization, informed by the data analysis, AI insights, and heuristic assessments, allows for improved results. Structured recommendations emerged, including the removal of redundant or occasionally used activities, reassignment of resources, and the introduction of efficiency-improving measures. Resource allocation optimization was achieved, ensuring that resources were efficiently matched to the demands of each case or activity. Efficiency improvements includes the streamlining of complex decision-making, automation of repetitive tasks, and optimization of activity sequencing. The optimized process aligned with industry best practices, regulatory requirements, and organizational standards. The optimized unstructured process can be seamlessly transitioned into a structured model such as BPMN, facilitating efficient and well-defined implementation.

For example, a case may involve information technology (IT) ticket handling, namely a process performed when a user submits a ticket indicating some technical problem with their system to an IT department of an organization. The unstructured (e.g., CMMN) representation of this may be as follows:

Case: Ticket Handling

Stage 1: Analysis

Task 1: Upon the arrival of a ticket, it is assigned to L1 support for initial analysis.

Milestone: Closure milestone is initiated to track the progress.

Stage 2: Resolution

Task 2: L1 support provides a solution to address the ticket.

Milestone: Closure milestone is achieved to signify the ticket's successful resolution.

Stage 3: Optional Actions (Discretionary Tasks)

Task 3: L1 support may choose to review previous tickets for reference.

Task 4: L1 support may consult experts for guidance.

Task 5: L1 support may contact the customer for clarification.

Task 6: After resolving the ticket, L1 support may follow up with the customer to assess satisfaction.

Data can then be collected about the actual running of this case from runtime logs and the input and output context of each activity. Every step in a CMMN process will have runtime context data on which it will work. The step may transform that data and that transformed context will be its output context. The context data and runtime execution logs can then be used as input to an AI/ML analysis to provide one or more insights about the case. Examples of such insights may include:

1) L1 never resolved issues with "runtime module" and always involves "Person A" for consultation.
2) Even after finding product related queries in previous ticket-always manager is involved for consultation if the customer's contract is above 100 million.
3) Customer satisfaction was asked only in 2 cases, etc.

These insights can then be used to optimize the CMMN by creating several recommended ways to optimize the CMMN, such as removing the step of "customer satisfaction", specifying an explicit mandatory task with century condition to involve the manager for big contracts, and always involve "Person A" if the ticket is related to "runtime module."

The heuristic rules engine also makes its own suggestions on how to optimize the unstructured process model or to use well-defined processes that are already stored in a repository. Recommendations on how to optimize the case are based on a comparison of attributes of the case with attributes stored in a repository. More particularly, once the relevant attributes are identified, the Heuristic Rules Engine proceeds to compare these attributes to a comprehensive repository of existing processes. This comparison process does not just rely on semantic search but employs a multi-faceted approach. First, the engine evaluates attribute similarity, looking for matches between the running CMMN process and processes in the repository based on shared attributes. The degree of attribute overlap serves as an initial indicator of relevance.

Furthermore, the engine examines attribute patterns and sequences to identify structural similarities between the running CMMN case and stored processes. This analysis considers not only the presence of attributes but also their temporal order and relationships within the process.

Eventually, the CMMN representation can then be converted to a BPMN representation by applying one or more of the recommendations.

Figure 2:
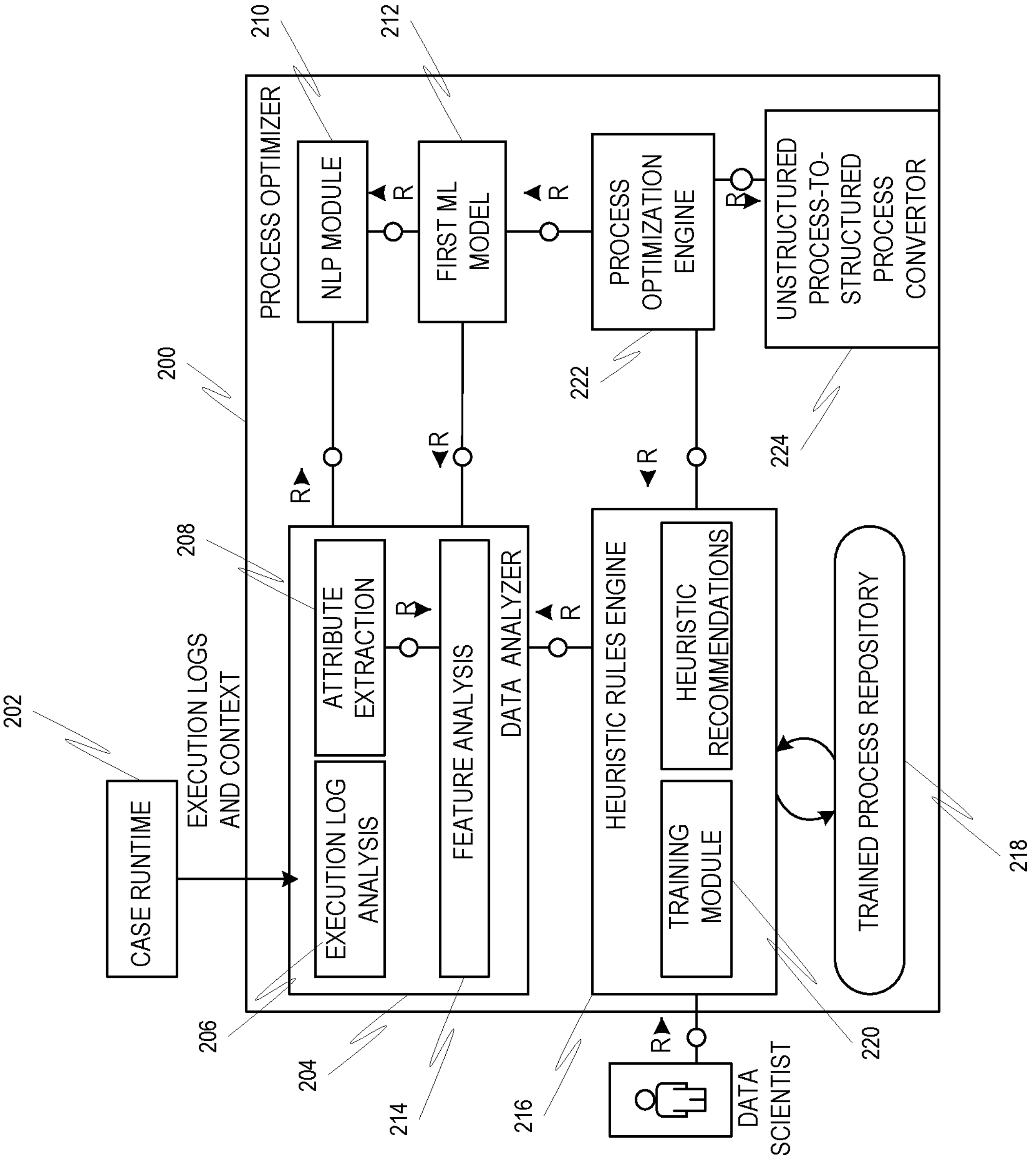
FIG. 2 is a block diagram illustrating a system for assisting in converting an unstructured process to a structured process, in accordance with an example embodiment.

FIG. 2 is a block diagram illustrating a system for assisting converting an unstructured process to a structured process, in accordance with an example embodiment. More particularly, a process optimizer 200 constitutes the component that will perform the conversion. A case runtime 202, including an execution log and step input/output context, is passed to a data analyzer 204 located on the process optimizer 200. The case runtime 202 is data about the running of a case from, for example, a CMMN engine, namely process data that is detected, measured, or otherwise obtained about one or more running processes in a case. The data analyzer 204 includes an execution log analysis component 206 that analyzes the execution log of the case runtime 202. An attribute extraction module 208 then extracts one or more attributes from the case runtime 202, and more particularly from the step context of each step being executed by the case runtime. The one or more attributes may then be passed to a natural language processor (NLP) module 210, which performs natural language processing techniques on the extracted one or more attributes to determine what the attribute(s) mean. A first machine learning model 212 then produces one or more recommendations to optimize the case based on the output of the execution log analysis component 206, the output of feature analysis component 214 which analyzes the key feature attributes extracted from the context attributes of the case steps captured by attribute extraction module 208.

A heuristic rules engine 216 takes attributes extracted by the attribute extraction module 208 and makes recommendations based on a comparison of those attributes to attributes in a trained process repository 218. A training module 220 is used to train the heuristic rules engine 216 and to populate or update the trained process repository 218.

A process optimization engine 222 takes the one or more recommendations from the first machine learning model 212 and the one or more recommendations from the heuristic rules engine 216 and then proceeds to suggest optimization on the unstructured case. The result is that the unstructured case is optimized and can be eventually converted into structured form.

An unstructured process-to-structured process converter 224 then actually performs the conversion itself, such as by converting an unstructured, but optimized, CMMN file into a BPMN file. This may include, for example, converting discretionary tasks into non-interrupting event-based sub-processes, changing sentry connections into sequences, and changing achieved milestones into events. It should be noted that it is not mandatory that this conversion process be performed automatically. In some example embodiments, hints or suggestions are provided to the process owner or process developer, but they are the ones who have to choose to convert.

The first machine learning model may be trained by any model from among many different potential supervised or unsupervised machine learning algorithms. It can also comprise multiple models working in tandem to achieve the goal. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the first machine learning algorithm used to train the first machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the first machine learning model may take place as a dedicated training phase. In other example embodiments, the first machine learning model may be retrained dynamically at runtime by the user providing live feedback.

Figure 3:
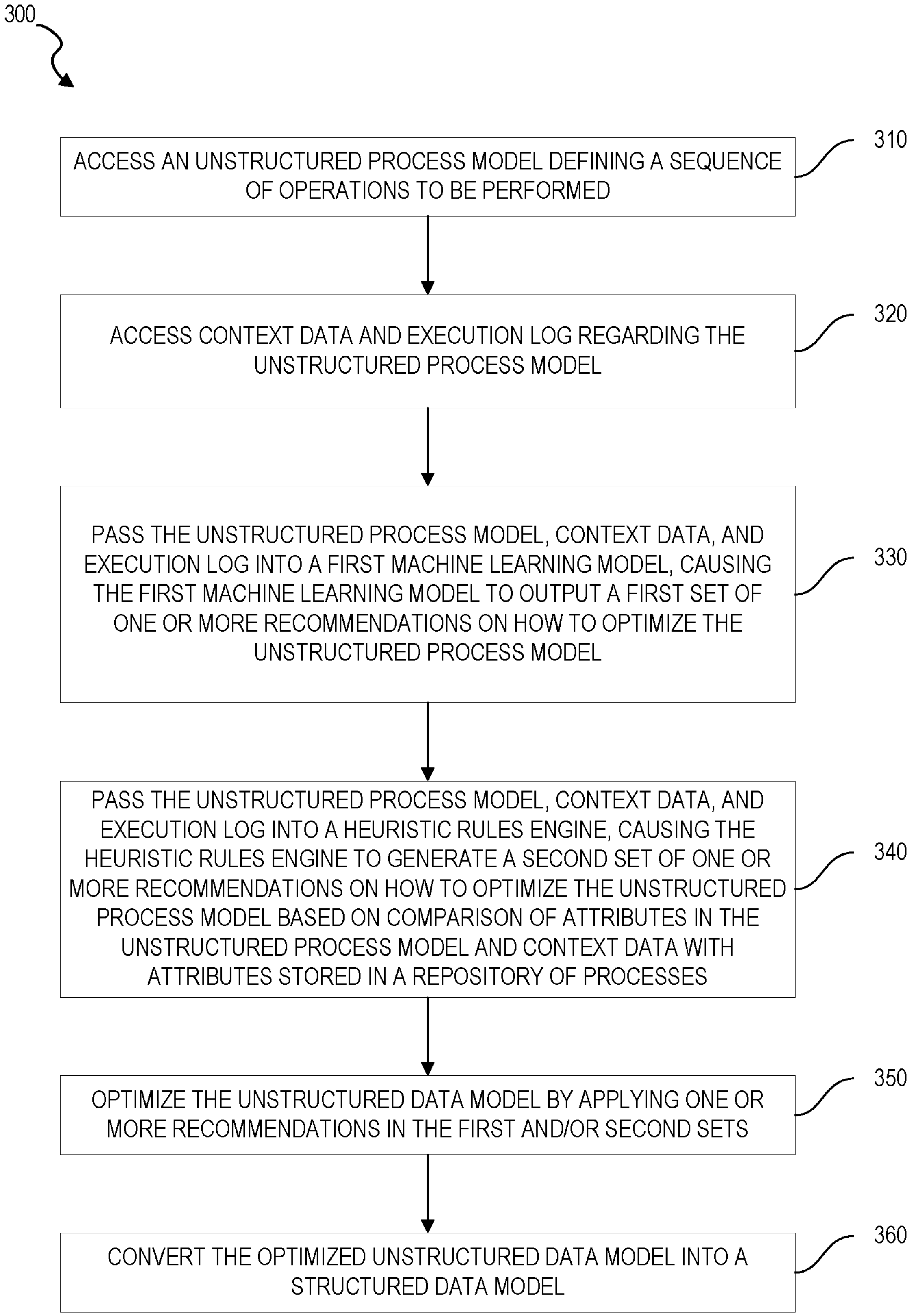
FIG. 3 is a flow diagram illustrating a method for converting an unstructured process model to a structured process model, in accordance with an example embodiment.

FIG. 3 is a flow diagram illustrating a method 300 for converting an unstructured process model to a structured process model, in accordance with an example embodiment. At operation 310, an unstructured process model defining a sequence of operations to be performed is accessed. At operation 320, context data and execution log regarding the unstructured process model, the context data including data gathered during past executions of the unstructured process model is accessed.

At operation 330, the unstructured process model, the context data, and the execution log are passed into a first machine learning model. The first machine learning model is trained to output one or more recommendations on how to optimize an input unstructured process model, based on the context data and execution log. Thus the passing causes the first machine learning model to output a first set of one or more recommendations on how to optimize the unstructured process model At operation 340, the unstructured process model, the context data, and the execution log are passed into a heuristic rules engine, causing the heuristic rules engine to generate a second set of one or more recommendations on how to optimize the unstructured process model based on comparison of attributes in the unstructured process model and context data with attributes stored in a repository of processes.

At operation 350, the unstructured data model is optimized by applying one or more recommendations in the first and/or second sets. At operation 360, the optimized unstructured data model is converted into a structured data model.

In other example embodiments, rather than using the recommendations to optimize the unstructured data model for conversion into a structured data model, recommendations from the first machine learning model regarding the unstructured data model are presented to a user via a user interface, allowing the user to modify the unstructured data model itself, or even to not modify the unstructured data model, based on the recommendations. For example, the recommendation may be to "involve person 1" because the system identifies that a ticket is related to a runtime module based on its historical learning from observing running CMMN processes, and person 1 is involved in the runtime module. Alternatively, the recommendation may be that the unstructured data model needs no modification.

In view of the disclosure above, various examples are set forth below. It should be noted that one or more features of an example, taken in isolation or combination, should be considered within the disclosure of this application.

Example 1 is a system comprising: at least one hardware processor; and a computer-readable medium storing instructions that, when executed by the at least one hardware processor, cause the at least one hardware processor to perform operations comprising: accessing an unstructured process model defining a sequence of operations to be performed; accessing context data regarding the unstructured process model, the context data including data gathered during past executions of the unstructured process model; passing the unstructured process model and the context data into a first machine learning model, the first machine learning model trained to output one or more recommendations on how to optimize an input unstructured process model, based on the context data, thereby causing the first machine learning model to output a first set of one or more recommendations on how to optimize the unstructured process model; passing the unstructured process model and the context data into a heuristic rules engine, causing the heuristic rules engine to generate a second set of one or more recommendations on how to optimize the unstructured process model based on comparison of attributes in the unstructured process model and context data with attributes stored in a repository of processes; optimizing the unstructured data model by applying one or more recommendations in the first and/or second sets; and converting the optimized unstructured data model into a structured data model.

In Example 2, the subject matter of Example 1 includes, wherein the operations further comprise transforming the context data using data normalization.

In Example 3, the subject matter of Examples 1-2 includes, wherein the operations further comprise extracting one or more attributes from the context data using a feature extraction process that identifies attributes and their interrelationships that were pertinent in the past executions of the unstructured process model.

In Example 4, the subject matter of Examples 1-3 includes, wherein the first machine learning model is a Naïve Bayes Classifier configured to calculate a probability of a particular activity in the context data being associated with a particular event in the unstructured process model.

In Example 5, the subject matter of Examples 1-4 includes, wherein the first machine learning model is a K-means clustering model configured to group activities in the context data based on their similarity to one another.

In Example 6, the subject matter of Example 5 includes, wherein the operations further comprise using Principal Component Analysis (PCA) to reduce dimensionality of the context data.

In Example 7, the subject matter of Examples 1-6 includes, wherein a recommendation in the first set of recommendations is a recommendation to remove a particular step from the unstructured process model.

Example 8 is a method comprising: accessing an unstructured process model defining a sequence of operations to be performed; accessing context data regarding the unstructured process model, the context data including data gathered during past executions of the unstructured process model; passing the unstructured process model and the context data into a first machine learning model, the first machine learning model trained to output one or more recommendations on how to optimize an input unstructured process model, based on the context data, thereby causing the first machine learning model to output a first set of one or more recommendations on how to optimize the unstructured process model; passing the unstructured process model and the context data into a heuristic rules engine, causing the heuristic rules engine to generate a second set of one or more recommendations on how to optimize the unstructured process model based on comparison of attributes in the unstructured process model and context data with attributes stored in a repository of processes; optimizing the unstructured data model by applying one or more recommendations in the first and/or second sets; and converting the optimized unstructured data model into a structured data model.

In Example 9, the subject matter of Example 8 includes, transforming the context data using data normalization.

In Example 10, the subject matter of Examples 8-9 includes, extracting one or more attributes from the context data using a feature extraction process that identifies attributes and their interrelationships that were pertinent in the past executions of the unstructured process model.

In Example 11, the subject matter of Examples 8-10 includes, wherein the first machine learning model is a Naïve Bayes Classifier configured to calculate a probability of a particular activity in the context data being associated with a particular event in the unstructured process model.

In Example 12, the subject matter of Examples 8-11 includes, wherein the first machine learning model is a K-means clustering model configured to group activities in the context data based on their similarity to one another.

In Example 13, the subject matter of Example 12 includes, using Principal Component Analysis (PCA) to reduce dimensionality of the context data.

In Example 14, the subject matter of Examples 8-13 includes, wherein a recommendation in the first set of recommendations is a recommendation to remove a particular step from the unstructured process model.

Example 15 is a non-transitory machine-readable medium storing instructions which, when executed by one or more processors, cause the one or more processors to perform operations comprising: accessing an unstructured process model defining a sequence of operations to be performed; accessing context data regarding the unstructured process model, the context data including data gathered during past executions of the unstructured process model; passing the unstructured process model and the context data into a first machine learning model, the first machine learning model trained to output one or more recommendations on how to optimize an input unstructured process model, based on the context data, thereby causing the first machine learning model to output a first set of one or more recommendations on how to optimize the unstructured process model; passing the unstructured process model and the context data into a heuristic rules engine, causing the heuristic rules engine to generate a second set of one or more recommendations on how to optimize the unstructured process model based on comparison of attributes in the unstructured process model and context data with attributes stored in a repository of processes; optimizing the unstructured data model by applying one or more recommendations in the first and/or second sets; and converting the optimized unstructured data model into a structured data model.

In Example 16, the subject matter of Example 15 includes, transforming the context data using data normalization.

In Example 17, the subject matter of Examples 15-16 includes, extracting one or more attributes from the context data using a feature extraction process that identifies attributes and their interrelationships that were pertinent in the past executions of the unstructured process model.

In Example 18, the subject matter of Examples 15-17 includes, wherein the first machine learning model is a Naïve Bayes Classifier configured to calculate a probability of a particular activity in the context data being associated with a particular event in the unstructured process model.

In Example 19, the subject matter of Examples 15-18 includes, wherein the first machine learning model is a K-means clustering model configured to group activities in the context data based on their similarity to one another.

In Example 20, the subject matter of Example 19 includes, using Principal Component Analysis (PCA) to reduce dimensionality of the context data.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 4:
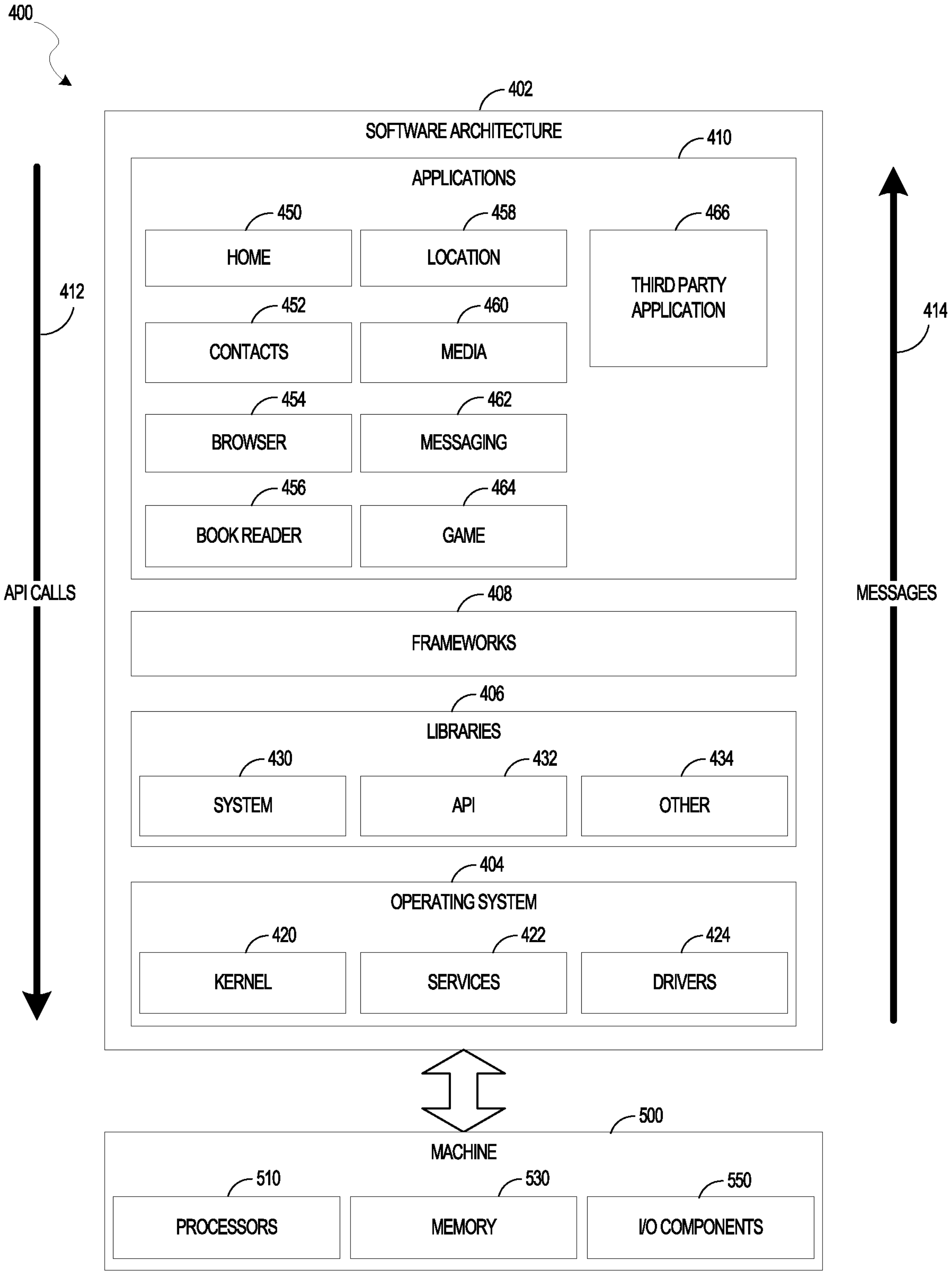
FIG. 4 is a block diagram illustrating an architecture of software, which can be installed on any one or more of the devices described herein.

FIG. 4 is a block diagram 400 illustrating a software architecture 402, which can be installed on any one or more of the devices described above. FIG. 4 is merely a non-limiting example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionalities. The services 422 can provide other common services for the other software layers. The drivers 424 are responsible for controlling or interfacing with the underlying hardware, according to some embodiments. For instance, the drivers 424 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 466 can invoke the API calls 412 provided by the operating system 404 to facilitate functionality described herein.

Figure 5:
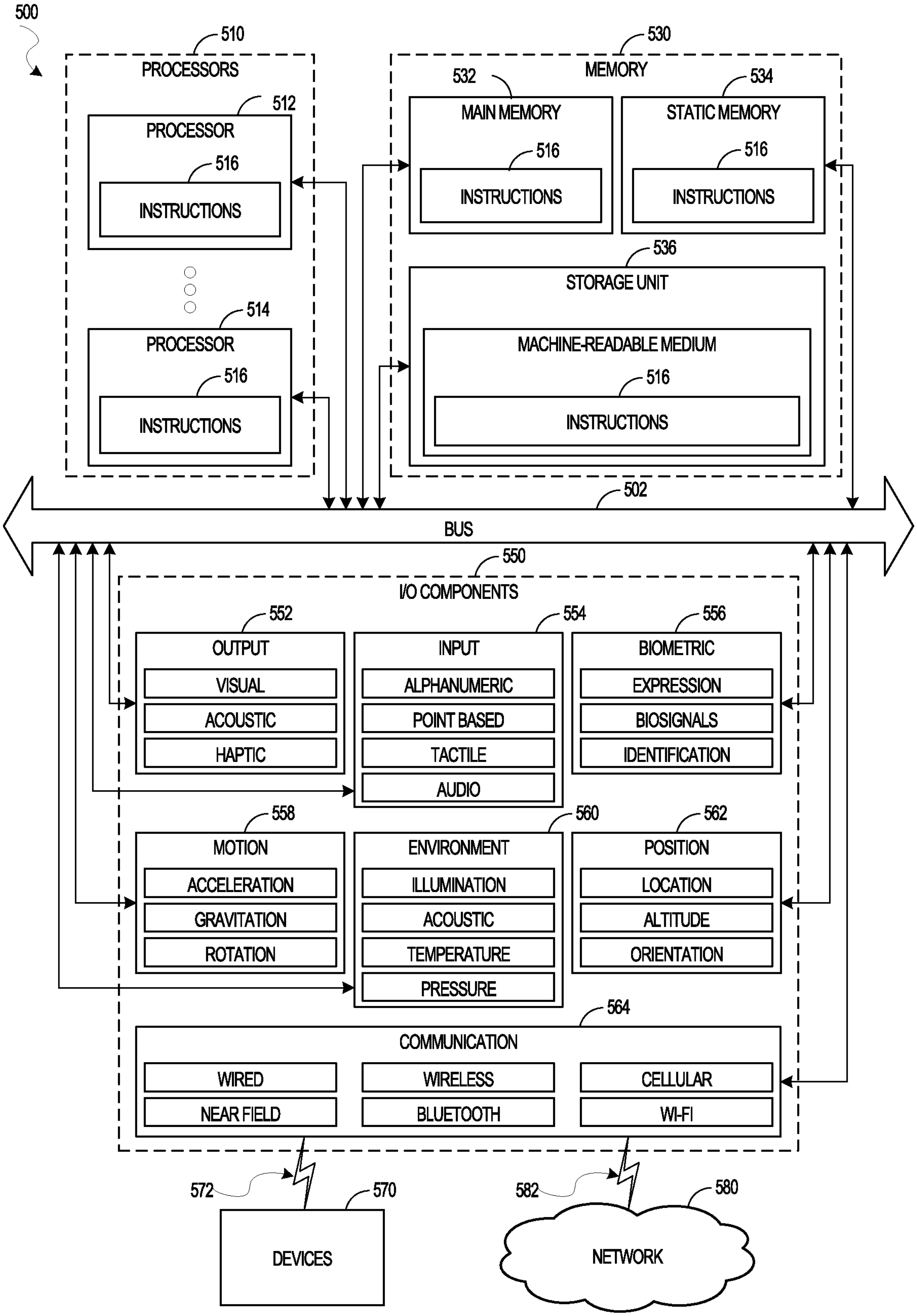
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example, the instructions 516 may cause the machine 500 to execute the method 300 of FIG. 3. Additionally, or alternatively, the instructions 516 may implement FIGS. 1-3 and so forth. The instructions 516 transform the general, non-programmed machine 500 into a particular machine 500 programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors that may comprise two or more independent processors (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor 512), multiple processors 512, 514 with a single core, multiple processors 512, 514 with multiple cores, or any combination thereof.

The memory 530 may include a main memory 532, a static memory 534, and a storage unit 536, each accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., coupled via a USB).

Moreover, the communication components 564 may detect identifiers or include components operable to detect identifiers. For example, the communication components 564 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

The various memories (e.g., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 580 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor; and a computer-readable medium storing instructions that, when executed by the at least one hardware processor, cause the at least one hardware processor to perform operations comprising:

accessing an unstructured process model data structure defining outcomes to be achieved without prescribing granular steps prior to execution of the unstructured process model data structure, wherein the unstructured process model data structure comprises a case plan model container, one or more stages, and one or more tasks;

accessing context data regarding the unstructured process model data structure, the context data including data gathered during past executions of the unstructured process model data structure;

passing the unstructured process model data structure and the context data into a first machine learning model, the first machine learning model trained to output one or more recommendations on how to optimize an input unstructured process model data structure, based on the context data, thereby causing the first machine learning model to output a first set of one or more recommendations on how to optimize the unstructured process model data structure;

passing the unstructured process model data structure and the context data into a heuristic rules engine, causing the heuristic rules engine to apply rules defining recommended process patterns and behaviors to generate a second set of one or more recommendations on how to optimize the unstructured process model data structure or use a process stored in a repository based on comparison of attributes in the unstructured process model data structure and context data with attributes stored in a repository of processes;

optimizing the unstructured data model by applying one or more recommendations in the first and/or second sets; and converting the optimized unstructured data model into a structured Business Process Model and Notation (BPMN) data structure executable by a prescriptive sequence-based process engine by at least one of: converting discretionary tasks into non-interrupting event-based sub-processes, changing sentry connections into sequences, or changing achieved milestones into events.

2. The system of claim 1, wherein the operations further comprise transforming the context data using data normalization.

3. The system of claim 1, wherein the operations further comprise extracting one or more attributes from the context data using a feature extraction process that identifies attributes and their interrelationships that were pertinent in the past executions of the unstructured process model.

4. The system of claim 1, wherein the first machine learning model is a Naïve Bayes Classifier configured to calculate a probability of a particular activity in the context data being associated with a particular event in the unstructured process model.

5. The system of claim 1, wherein the first machine learning model is a K-means clustering model configured to group activities in the context data based on their similarity to one another.

6. The system of claim 5, wherein the operations further comprise using Principal Component Analysis (PCA) to reduce dimensionality of the context data.

7. The system of claim 1, wherein the operations further comprise suggesting the one or more recommendations to a user via a user interface, prior to the optimizing.

8. A method comprising:

accessing an unstructured process model data structure defining outcomes to be achieved without prescribing granular steps prior to execution of the unstructured process model data structure, wherein the unstructured process model data structure comprises a case plan model container, one or more stages, and one or more tasks;

accessing context data regarding the unstructured process model data structure, the context data including data gathered during past executions of the unstructured process model data structure;

passing the unstructured process model data structure and the context data into a first machine learning model, the first machine learning model trained to output one or more recommendations on how to optimize an input unstructured process model data structure, based on the context data, thereby causing the first machine learning model to output a first set of one or more recommendations on how to optimize the unstructured process model data structure;

passing the unstructured process model data structure and the context data into a heuristic rules engine, causing the heuristic rules engine to apply rules defining recommended process patterns and behaviors to generate a second set of one or more recommendations on how to optimize the unstructured process model data structure or use a process stored in a repository based on comparison of attributes in the unstructured process model data structure and context data with attributes stored in a repository of processes;

optimizing the unstructured data model by applying one or more recommendations in the first and/or second sets; and converting the optimized unstructured data model into a structured Business Process Model and Notation (BPMN) data structure executable by a prescriptive sequence-based process engine by at least one of: converting discretionary tasks into non-interrupting event-based sub-processes, changing sentry connections into sequences, or changing achieved milestones into events.

9. The method of claim 8, further comprising transforming the context data using data normalization.

10. The method of claim 8, further comprising extracting one or more attributes from the context data using a feature extraction process that identifies attributes and their inter-relationships that were pertinent in the past executions of the unstructured process model.

11. The method of claim 8, wherein the first machine learning model is a Naïve Bayes Classifier configured to calculate a probability of a particular activity in the context data being associated with a particular event in the unstructured process model.

12. The method of claim 8, wherein the first machine learning model is a K-means clustering model configured to group activities in the context data based on their similarity to one another.

13. The method of claim 12, further comprising using Principal Component Analysis (PCA) to reduce dimensionality of the context data.

14. The method of claim 8, further comprising suggesting the one or more recommendations to a user via a user interface, prior to the optimizing.

15. A system comprising:

at least one hardware processor; and a computer-readable medium storing instructions that, when executed by the at least one hardware processor, cause the at least one hardware processor to perform operations comprising:

accessing an unstructured process model data structure defining outcomes to be achieved without prescribing granular steps prior to execution of the unstructured process model data structure, wherein the unstructured process model data structure comprises a case plan model container, one or more stages, and one or more tasks;

accessing context data regarding the unstructured process model data structure, the context data including data gathered during past executions of the unstructured process model data structure;

passing the unstructured process model data structure and the context data into a first machine learning model, the first machine learning model trained to output one or more recommendations on how to optimize an input unstructured process model data structure, based on the context data, thereby causing the first machine learning model to output a first set of one or more recommendations on how to optimize the unstructured process model data structure;

passing the unstructured process model data structure and the context data into a heuristic rules engine, causing the heuristic rules engine to apply rules defining recommended process patterns and behaviors to generate a second set of one or more recommendations on how to optimize the unstructured process model data structure or use a process stored in a repository based on comparison of attributes in the unstructured process model data structure and context data with attributes stored in a repository of processes;

optimizing the unstructured data model by applying one or more recommendations in the first and/or second sets; and converting the optimized unstructured data model into a structured Business Process Model and Notation (BPMN) data structure executable by a prescriptive sequence-based process engine by at least one of: converting discretionary tasks into non-interrupting event-based sub-processes, changing sentry connections into sequences, or changing achieved milestones into events.

16. The system of claim 15, further comprising transforming the context data using data normalization.

17. The system of claim 15, further comprising extracting one or more attributes from the context data using a feature extraction process that identifies attributes and their inter-relationships that were pertinent in the past executions of the unstructured process model.

18. The system of claim 15, wherein the first machine learning model is a Naïve Bayes Classifier configured to calculate a probability of a particular activity in the context data being associated with a particular event in the unstructured process model.

19. The system of claim 15, wherein the first machine learning model is a K-means clustering model configured to group activities in the context data based on their similarity to one another.

20. The system of claim 19, further comprising using Principal Component Analysis (PCA) to reduce dimensionality of the context data.

* * * * *